United States Patent [19]

Hideshima et al.

[11] Patent Number: 5,416,605
[45] Date of Patent: May 16, 1995

[54] PRINT CONTROL METHOD AND APPARATUS FOR MICROFILM READER

[75] Inventors: Takahiro Hideshima; Ushio Anayama, both of Kanagawa, Japan

[73] Assignee: Fuji Photo Film Co., Ltd., Kanagawa, Japan

[21] Appl. No.: 219,893

[22] Filed: Mar. 30, 1994

[30] Foreign Application Priority Data

Mar. 30, 1993 [JP] Japan ................................ 5-093961
Apr. 26, 1993 [JP] Japan ................................ 5-120332

[51] Int. Cl.⁶ ...................... H04N 1/38; H04N 1/393; G03B 27/52
[52] U.S. Cl. .................................. 358/451; 358/453; 358/487; 355/41; 355/45; 353/26 A
[58] Field of Search ............... 358/451, 452, 453, 450, 358/448, 487, 401, 506, 527, 537, 538, 501, 296; 355/41, 44, 45, 55, 56, 271, 243; 353/26 R, 26 A, 27 R, 27 A

[56] References Cited

U.S. PATENT DOCUMENTS

| | | | |
|---|---|---|---|
| 4,745,489 | 5/1988 | Kashiwagi et al. | 358/296 |
| 4,750,021 | 6/1988 | Holroyd et al. | 355/41 |
| 4,908,654 | 3/1990 | Holroyd | 355/41 |
| 5,061,955 | 10/1990 | Watanabe | 355/45 |

*Primary Examiner*—Scott A. Rogers
*Attorney, Agent, or Firm*—Sughrue, Mion, Zinn, Macpeak & Seas

[57] ABSTRACT

A print control method for a microfilm reader enlarges a recorded image on a microfilm to the size of an original copy and projects the image on a screen; detects a black frame from an array indicated by image signals which are obtained by being binarized; selects one or more images from the entire area of the images; modifies images other than selected image to black frames; erases the modified black frames; enlarges the selected images at a magnification which can be arbitrarily set; and prints them out. The entire enlarged and projected image without any missing parts is included in the display area of the screen without making the screen too large. If plural images are contained in the display area of the read image, or if part of an image is outside of the display area, it is possible to output only the required images by extracting them and erasing unnecessary images together with the black frames. Moreover, paper can be efficiently utilized by arbitrarily changing the print magnification. In an embodiment where the selected image is enlarged to the maximum size that fits a predetermined print paper size, and printed out on the paper of this size, the image can be made easy to view, and the image can also be efficiently utilized. An apparatus suitable for this control method is also provided.

5 Claims, 10 Drawing Sheets

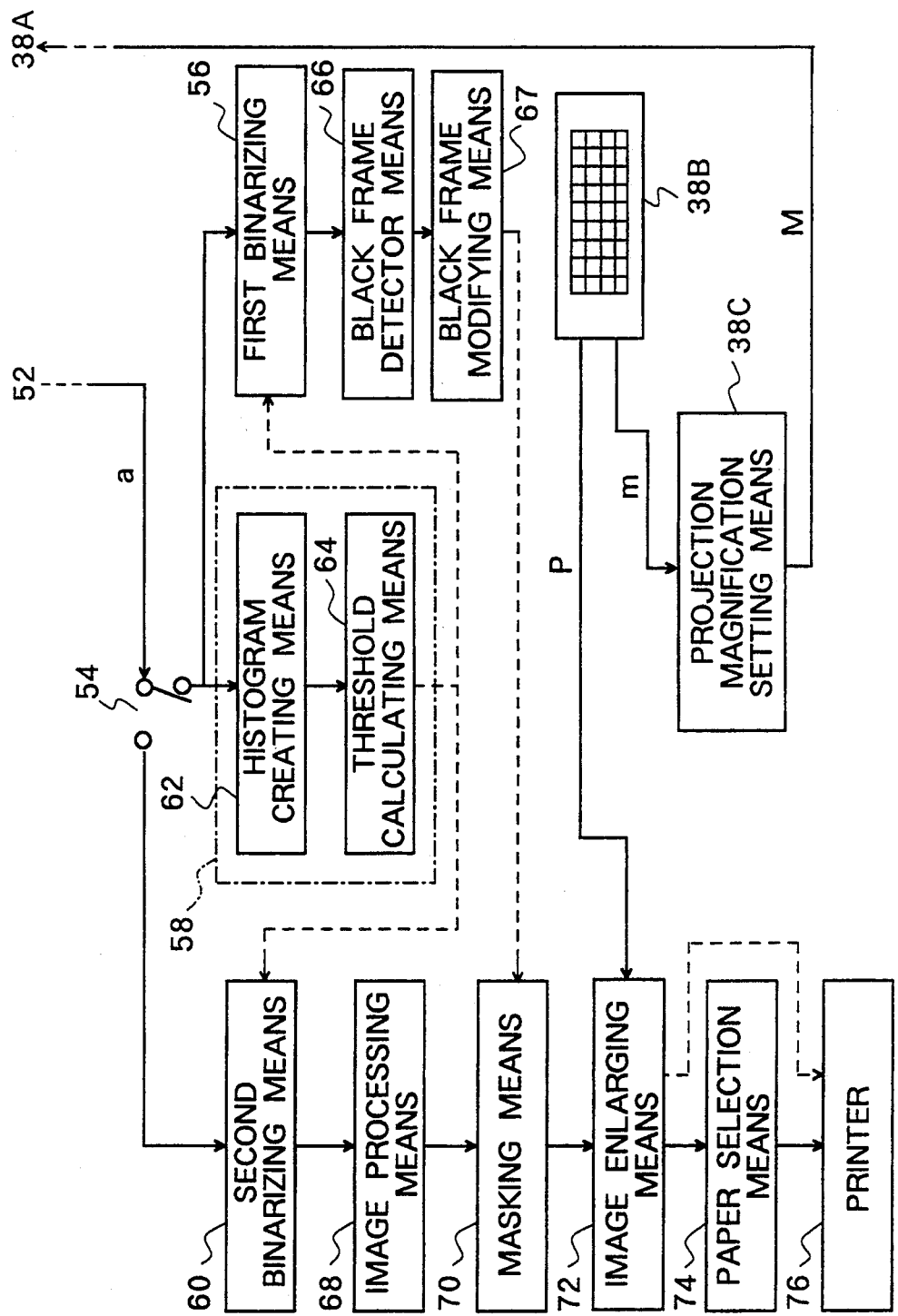

(A)

(B)

PRINT CONTROL METHOD AND APPARATUS FOR MICROFILM READER

BACKGROUND OF THE INVENTION

1. Field of the Invention

The present invention relates to a print control method for detecting and deleting the black frame which appears around a positive image area obtained from a negative microfilm, and an apparatus suitable for this control method.

2. Prior Art

In a negative microfilm, a transparent area without an image is creaked to surround an image area of an original copy. When the image of the original copy is printed out, it is necessary to output an area larger than the original copy so that the entire area of the original copy does not go beyond the output area.

FIG. 9 shows the relationship between the microfilm and the print output. Original copy images 12, 14 are recorded or photographed on the microfilm 10 at a predetermined or given size as negative images. Since the area 16 to be enlarged and projected onto a screen is predetermined, black frames 22, 24 appear outside print images 12A, 14A of the images 12, 14 respectively when the entire image of the area 16 is reversed to, and printed as, positive images.

Methods for automatically detecting and masking these black frames 22, 24 have been proposed. In one of the prior methods, an image is read by a line sensor on respective scanning lines 26 at a predetermined interval (for example, 1 mm). If image signals continuously provide black pixels at a predetermined number of N (for example, 224), such portion is determined as the black frames 22, 24. The predetermined number N=224 is, for example, a length corresponding to 14 mm on the original copy or document.

As shown in FIG. 9, this prior method detects a coordinate x where N black pixels continue, from a coordinate X where the distribution of pixels on the scanning line 26 changes from white pixels to black pixels, and determines the coordinate X=x−N, which is the coordinate traced back from the coordinate x by N pixels, as a coordinate of a peripheral portion of the black frame. Then, similarly, the peripheral coordinates of black frame $X_n$, $X_{n+1}$, $X_{n+2}$, .... are sequentially found for the n-th, (n+1)-th, (n+2)-th .... scanning lines 26 at a predetermined interval (for example, 1 mm) to find the region of the black frame or the masking frame connecting each peripheral coordinate of $X_n$, $X_{n+1}$, $X_{n+2}$.

In the present specification, a black frame means a frame margin other than an image which appears when a projected image (negative image) is reversed to make it a positive image, and in which black pixels constitute the black frame. In the negative image before negativepositive reversal, portions other than the image appear as a transparent (or white) frame, while black pixels appear as white ones. In this specification, such portions other than the image are called a black frame regardless of negative-positive reversal, and pixels constituting such a black frame are called black pixels.

A conventional apparatus projects a frame of the microfilm on a screen with a magnification which enlarges it to the original size of the original copy (hereinafter called a restore magnification), and detects the black frame by using the enlarged image appearing on the screen. Then, it reads the enlarged image projected on the screen with a line sensor, which moves behind the screen, and outputs to a printer for printout in the same size as the original copy after removing the black frame from the thus read image.

On the other hand, the microfilm is shot with frames of a prescribed size at a fixed interval. However, since the size of the screen on which a predetermined area is read from the recorded microfilm and displayed is predetermined, there may arise a situation in which a plurality of projected images are contained in the display area of the screen, or where part of an image extends outside of the display area, depending on the stopping position of the microfilm. In addition, depending on the type of microfilm, a plurality of a small original copies or documents such as bank bills or checks, or the front and back sides thereof are shot or photographed in one frame. In such a case, a plurality of document images are contained in one display area.

FIGS. 4 (A) and 5 (A) show the relationship between the microfilms 10A, 10B and the enlarged projection area 16A, 16B of the screen, respectively. In FIG. 4 (A), for example, reduced images 12C, 12D of an A-4 size original documents are photographed in the microfilm 10A, and part of one image 12D is out of the area 16A on the screen on which it is enlarged and projected. Here, the projection area 16A on the screen is assumed to be A-3 size.

In addition, the microfilm 10B shown in FIG. 5 (A) contains images 12E, 12F .... of the front side and those 12e, 12f, .... of the back side of a draft or check. The projection area 16B of an A-3 size screen, for example, contains a plurality of these document images.

As described above, since an image magnified by the restore magnification is projected onto the screen, the size of the display area of the screen is determined to be of a size necessary and sufficient to contain the image at the restore magnification. However, to prevent the apparatus from becoming too large, the screen cannot be made too large with regard to the recovered size. In addition, if the screen is too small, a portion of the projected image falls beyond the display area of the screen when the position of the projected image is shifted or inclined from the normal position. Moreover, when a plurality of document images are contained in the projection and display area of the screen, an unnecessary document image or an image having a missing part is output to a printer or the other external device even if the black frame is removed as described.

It is also conceivable to print an image by removing the unnecessary image portion or the image portion having a missing part. In this case, however, if it is printed out at the same size (for example, A-3 size) as the areas 16A, 16B which are enlarged and projected onto the screen, a large blank area is produced surrounding the document images (for example, 12C, 12f) on the print paper 18A, 18B as shown in FIGS. 4 (B) and 5 (B).

Furthermore, it is desirable to print out images on paper with the same size for convenience of filing. In this case, if the size of the images to be printed is not standardized, the print out may be poor in appearance since a large blank zone is produced around the image or a part of the image may not be recorded on the paper.

OBJECTS AND SUMMARY OF THE INVENTION

The present invention is intended to solve the problems described above. The first object of the present invention is to provide a print control method for a microfilm reader which allows an entire image without any missing parts to be contained in the display area of a screen without making it too large even if the position of an enlarged and projected image is slightly shifted or inclined, and which, when a plurality of images are contained in a display area for the read image, or when part of an image is outside of the display area, allows it to extract only the required images and to remove any unnecessary image or an image with a missing part together with a black frame for output, and which allows it to efficiently utilize a sheet of print paper by arbitrarily changing print magnification.

The second object is to provide an apparatus that can be used for implementing this method.

The third object of the present invention is to provide a print control method for a microfilm reader which allows an entire image, without any missing parts, to be contained in the display area of a screen without making it too large even if the position of an enlarged and projected image is slightly shifted or inclined, and which, when a plurality of images are contained in a display area for the read image, or when a part of an image is outside of the display area, allows it to extract only required images and to remove an unnecessary image or an image with a missing part together with a black frame for output, and which allows it to efficiently utilize a sheet of print paper by adjusting the size of it so as to facilitate filing.

The fourth object is to provide an apparatus that can be used for implementing this method.

According to the present invention, the first object can be attained by the provision of a method for printing out an image by projecting on a screen a recorded image photographed on a microfilm, by detecting a black frame from an array of pixels indicated by image signals, which is obtained by reading and binarizing the projected image on the screen, and by erasing said black frame from the projected image, a print control method for a microfilm reader comprising steps of:

a) enlarging the recorded image with a magnification $M$ lower than a restore magnification $m$ for enlarging to the size of an original copy, and projecting the thus enlarged image as the projected image on the screen;

b) when an entire area of said projected image read from the screen contains plural document images and black frames thereof, selecting one or more document images as a selected document image, and modifying other document images other than said selected document image to black frames;

c) erasing said modified black frames from the projected image;

d) enlarging said selected document images without black frames including the modified black frame at a magnification which can be arbitrarily set; and e) printing out the thus enlarged selected document image.

In this case, it is desirable that the size of the print paper is automatically adjusted to the minimum one for an enlarged image.

The second object of the present invention can be attained by the provision of a print control apparatus for a microfilm reader comprising:

an optical system for enlarging a recorded image photographed on a microfilm and projecting the thus enlarged image on a screen;

image reading means for reading the enlarged and projected image on the screen and outputting image signals;

binarizing means for binarizing the image signals and outputting binarized image signals;

black frame detector means for detecting a black frame from an array of pixels indicated by the binarized image signals;

masking means for erasing the detected black frame from an image read by said image reading means; and a printer for printing out the image with a black frame erased;

said print control apparatus for a microfilm reader being characterized by further comprising:

a) restore magnification inputting means for inputting a restore magnification $m$ which is a magnification ratio for enlarging the recorded image photographed on the microfilm to the size of an original copy;

b) projection magnification setting means for setting a magnification $M$ of said optical system lower than said restore magnification $m$;

c) when said projected image contains plural document images and black frames thereof, black frame modifying means for selecting one or more document images as a selected document image and for modifying other document images other than the selected document image into black frames;

d) print magnification setting means for setting print magnification for the selected document image; and e) paper selection means for automatically selecting a size of paper on which the selected document image is printed out at said print magnification;

wherein said masking means erases the modified black frames, said printer printing out said selected document image at said print magnification on the paper of size selected by said paper selection means.

The third object of the present invention can be attained by the provision of a method for printing out an image by projecting on a screen a recorded image photographed on a microfilm, by detecting a black frame from an array of pixels indicated by image signals, which is obtained by reading and binarizing the projected image on the screen, and by erasing said black frame from the projected image, a print control method for a microfilm reader comprising steps of:

a) enlarging the recorded image with a magnification $M$ lower than a restore magnification $m$ for enlarging to the size of original copy, and projecting the thus enlarged image as the projected image on the screen;

b) when an entire area of said projected image read from the screen contains plural document images and black frames thereof, selecting one or more document images as a selected document image, and modifying other document images other than said selected document image to black frames;

c) erasing said modified black frames from the projected image;

d) enlarging said selected document images without black frames including the modified black frame to the maximum size that fit a predetermined paper size; and e) printing out the thus enlarged selected document image on said paper size.

Finally, the fourth object of the present invention can be attained by the provision of a print control apparatus for a microfilm reader comprising:

an optical system for enlarging a recorded image photographed on a microfilm and projecting the thus enlarged image on a screen;

image reading means for reading the enlarged and projected image on the screen and outputting image signals;

binarizing means for binarizing the image signals and outputting binarized image signals;

black frame detector means for detecting a black frame from an array of pixels indicated by the binarized image signals;

masking means for erasing the detected black frame from an image read by said image reading means; and a printer for printing out the image with a black frame erased on a print paper of predetermined size;

said print control apparatus for a microfilm reader being characterized by further comprising:

a) restore magnification inputting means for inputting a restore magnification $\underline{m}$ which is magnification ratio for enlarging the recorded image photographed on the microfilm to the size of an original copy;

b) projection magnification setting means for setting a magnification $\underline{M}$ of said optical system lower than said restore magnification $\underline{m}$;

c) when said projected image contains plural document images and black frames thereof, black frame modifying means for selecting one or more document images as a selected document image and for modifying other document images other than the selected document image into black frames;

d) image enlarging means for enlarging said selected document image to the maximum size that fits the predetermined print paper size;

wherein said masking means erases the modified black frames, said printer printing out on the paper with said predetermined size the image enlarged by said image enlarging means.

BRIEF DESCRIPTION OF THE DRAWINGS

FIG. 1B is a diagrammatical illustration showing the first and the second embodiments of the present invention;

DESCRIPTION OF THE PREFERRED EMBODIMENTS

First Embodiment

Figure 1A:
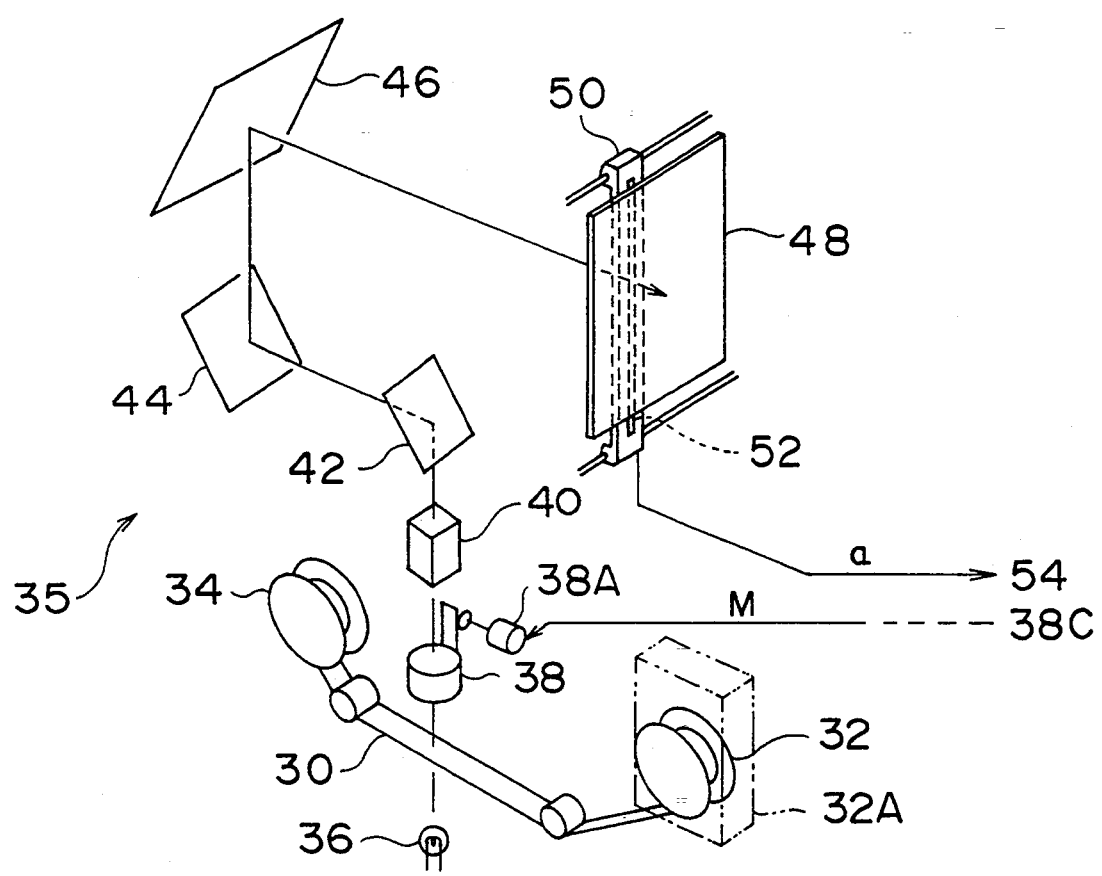
FIG. 1A is a schematic illustration showing a microfilm reader assembled in a first and a second embodiment of the present invention.
Figure 2:
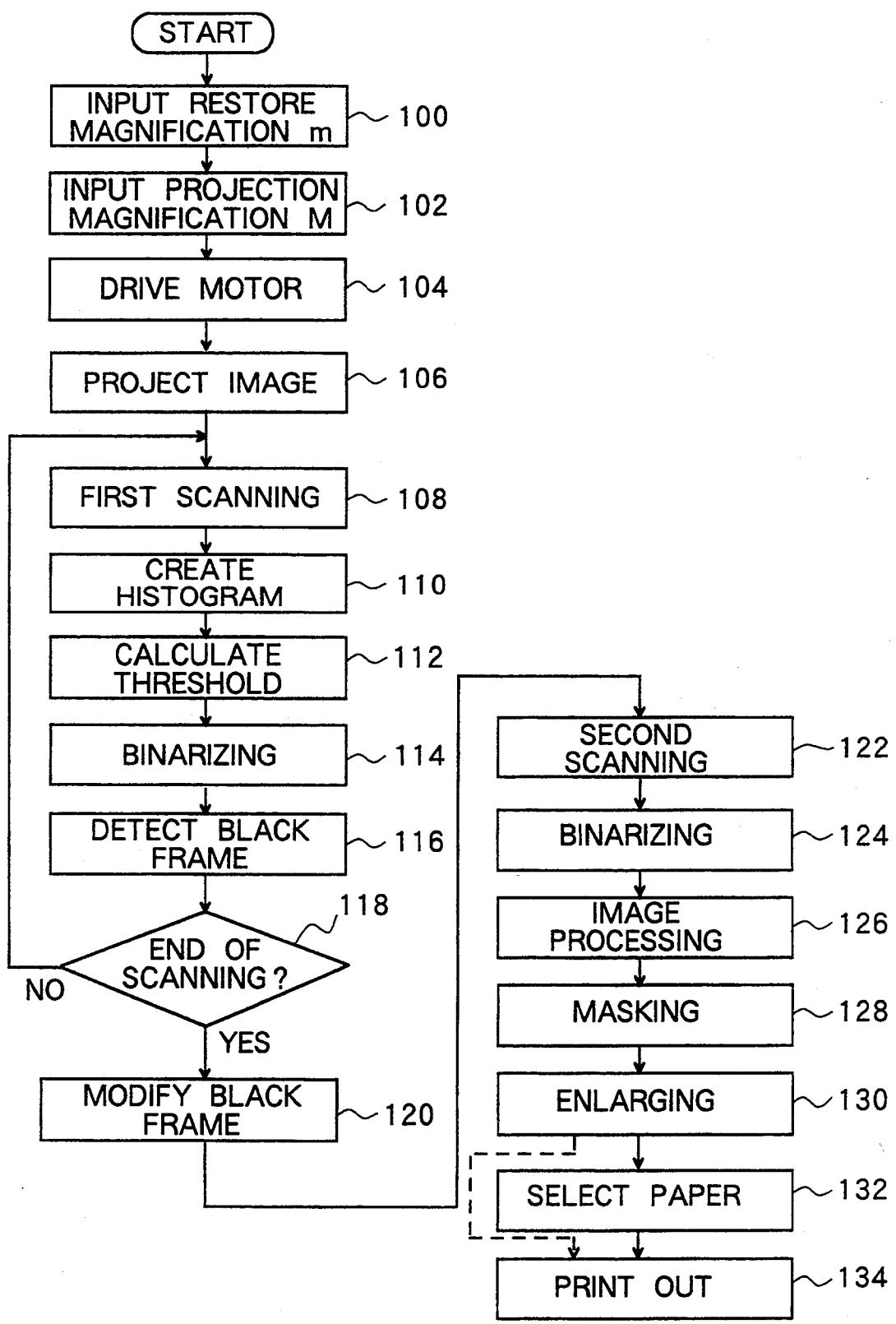
FIG. 2 is a block diagram showing the operation sequence of the first and the second embodiments of the present invention.
Figure 3:
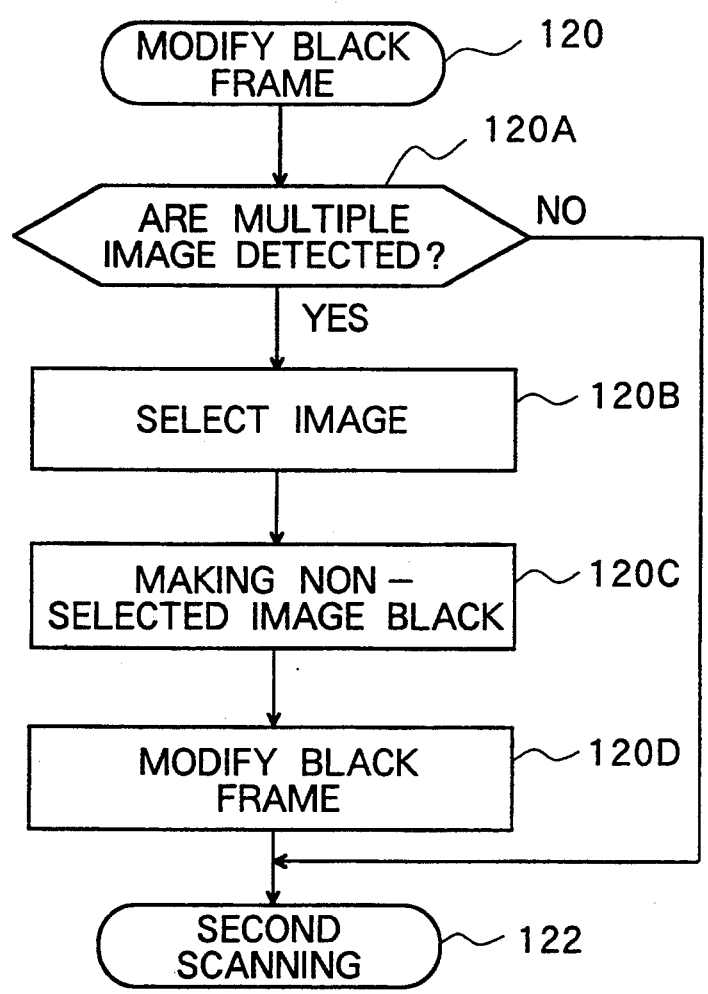
FIG. 3 is a detailed flow chart for an operation sequence in a black frame modifying process.
Figure 4:
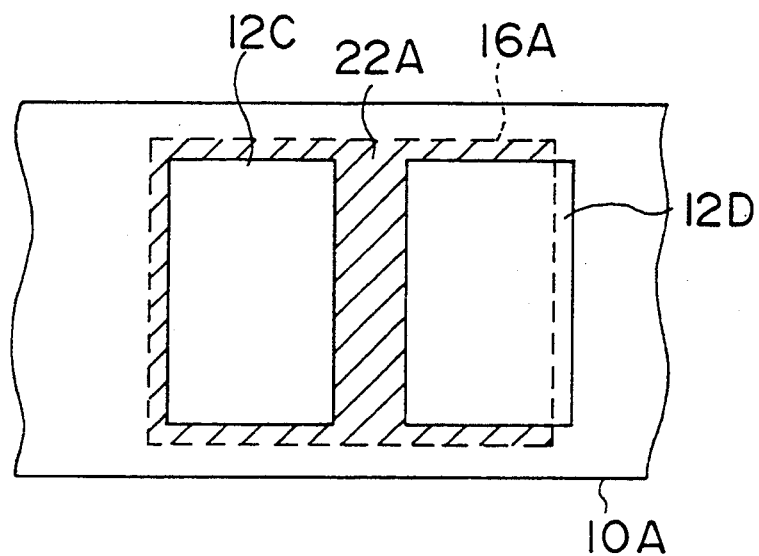
FIG. 4, parts A and B, shows examples of a printout according to the first embodiment of the present invention.
Figure 4:
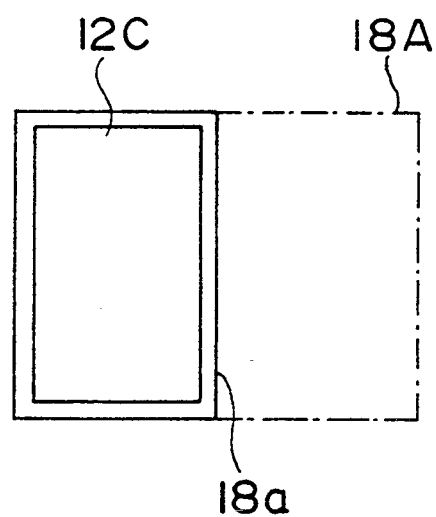
Figure 5:
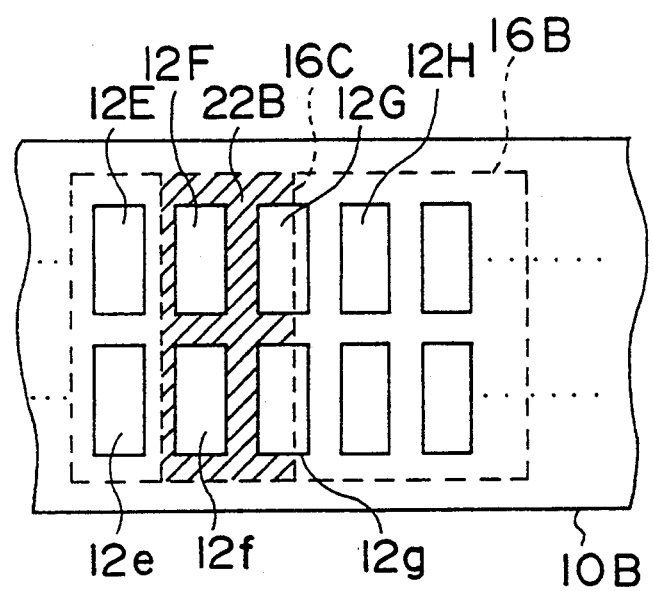
FIG. 5, parts A and B, shows examples of a printout according to the first embodiment of the present invention.
Figure 5:
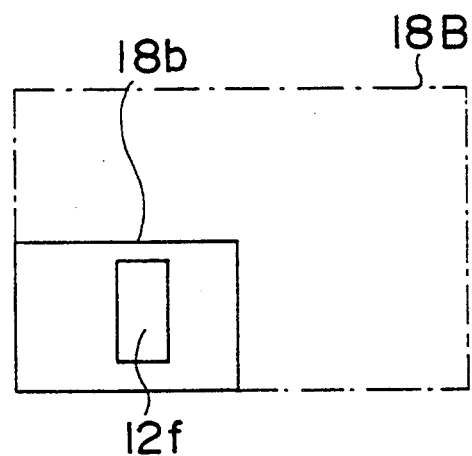
Figure 6:
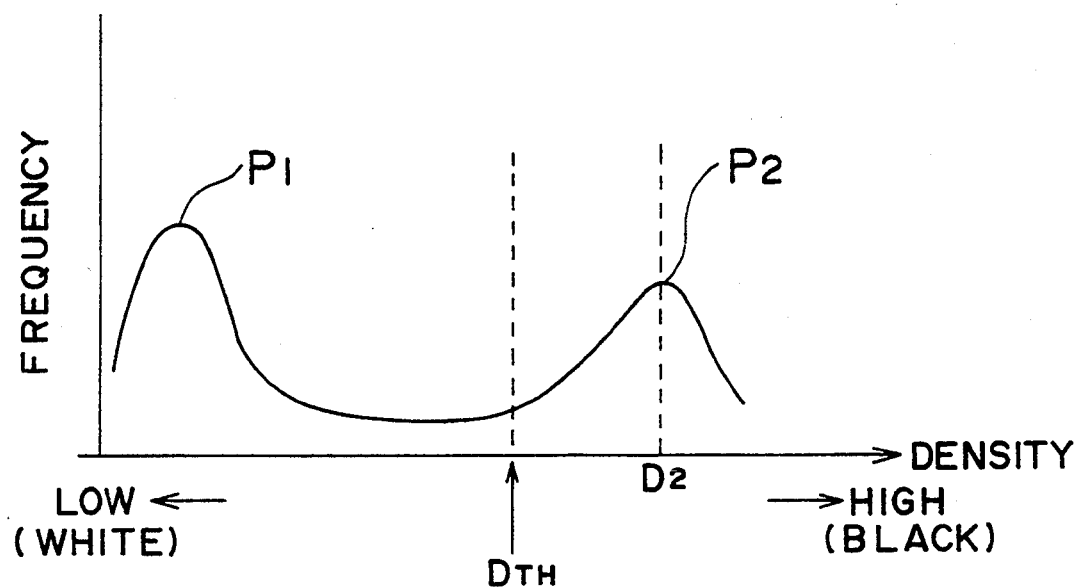
FIG. 6 is a density histogram showing a distribution of the number of pixels at density D.

FIGS. 1A and 1B are overall arrangements of a first and a second embodiment of the present invention. FIG. 2 is a block diagram showing operation sequence of the first and the second embodiments of the present invention. FIG. 3 is a detailed flow chart for an operation in modifying a black frame. FIG. 4 is an example of a printout according to this embodiment. FIG. 5 is another example of a printout according to this embodiment. FIG. 6 is a density histogram showing distribution of the number of pixels at density D.

Initially, referring to FIG. 1, reference numeral 30 denotes a microfilm which is wound and run from a supply reel 32 to a take-up reel 34. The light from a light source 36 is guided onto the microfilm 30 from the underside. The light passed through the microfilm 30 is guided to a screen 48 from its back side through a projecition lens 38, an image rotating prism 40, and reflecting mirrors 42, 44, 46. The projection lens 38, the image rotating prism 40, and the reflecting mirrors 42, 44, 46 constitute an optical system 35. The projection area of the screen 48 is set, for example, to an A-3 size.

A movable plate 50 movable in the horizontal plane is disposed in parallel with an elongated rear side of the screen 48 and extending along the vertical plane, and a CCD line sensor 52 as an image reading means is mounted on the movable plate 30 in the vertical direction thereof. With this construction, it is possible to read the image projected on the screen 48 by reading the portion of the image incident on the line sensor 52, while moving the movable plate 50 along the horizontal plane.

Here, magnification $\underline{M}$ of the optical system 35 can be varied by the magnification ratio of the projection lens 38, while the magnification ratio of the projection lens 38 can be varied by a motor 38A. Magnification $\underline{m}$ necessary to restore an image reduced and shot on the microfilm to the size of an original copy is entered through a keyboard 38B. This magnification $\underline{m}$ is referred to as "restore magnification $\underline{m}$", hereinafter.

Reference numeral 38C denotes projection magnification setting means for setting magnification $\underline{M}$ lower than the restore magnification $\underline{m}$ which is previously entered through the keyboard 38B as restore magnification setting means, and for driving the motor 38A so that the optical system 35 has a magnification of $\underline{M}$. Instead of using the keyboard 38B, the restore magnification $\underline{m}$ may be automatically entered by reading an identification mark such as a bar code which is provided on a microfilm cartridge 32A (FIG. 1A) loaded with the supply reel 32.

The bar code may be attached to the front end of the microfilm, or photographed near each frame of the image photographed on the microfilm. Since the magnification $\underline{M}$ of the optical system 35 is lower than the restore magnification $\underline{m}$, the image can be projected on the screen 48 with a sufficient margin around the enlarged and projected image so that there is little fear of the image being outside the projection area of the screen 48.

In reading the image by a first scanning, an output signal a from the line sensor 52 is input to a first binarizing means 56 and a threshold detector means 58 through a change-over switch 54 shown in FIG. 1B. Upon reading the image at a second scanning, the output signal a from the line sensor 52 is input to a second binarizing means 60 by changing over the change-over switch 54.

As described in the background section of the present specification, since the scanning line 26 for detecting a black frame (cf. FIG. 7) is read at a predetermined interval (for example, 14 mm), there remain other scanning lines 26 corresponding to image reading density between each scanning line 26. For example, when a width of 1 mm is read by 16 lines of the scanning lines 26, there are 15 lines of the scanning lines between the scanning lines 26 for detecting the black frame. The scanning lines other than the black frame detecting scanning lines 26 or all the scanning lines including the black frame detecting scanning lines 26 are used for finding a threshold $D_{TH}$ as described later.

In the present invention, the black frame detecting scanning lines 26 with the predetermined interval are input into the first binarizing means 56, while other scanning lines are input into the threshold detector means 58.

The threshold detector means 58 has a histogram creating means 62, and threshold calculating means 64. The histogram creating means 62 creates a density histogram shown in FIG. 6 by using image signals from the line sensor 52 which has read the scanning lines other than the black frame detecting scanning lines. The histogram shows the distribution of the number of pixels at density D.

The histogram creating means 62 finds the histogram by using 15 scanning lines between the n-th black frame detecting scanning line 26(n) and the (n−1)-th black frame detecting scanning line 26(n−1) before it. The threshold calculating means 64 calculates the threshold $D_{TH}(n)$ at the n-th black frame detecting scanning line 26(n) by using this histogram.

Figure 7:
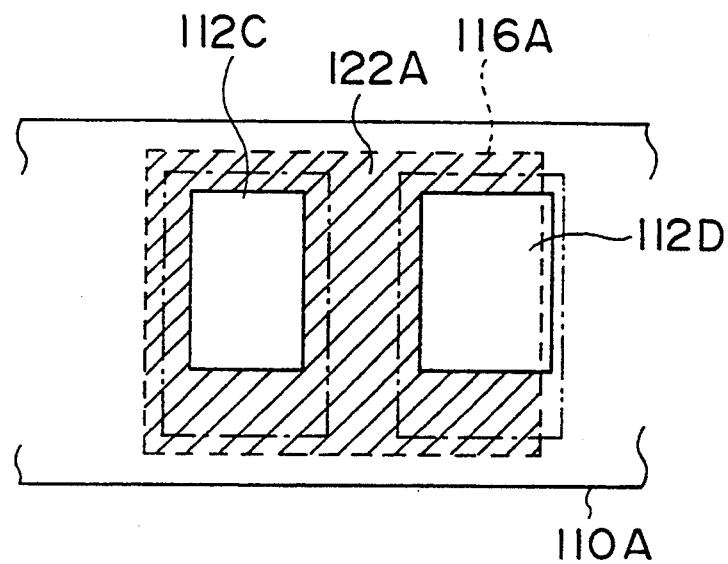
FIG. 7, parts A and B, shows examples of a printout according to the second embodiment of the present invention.
Figure 7:
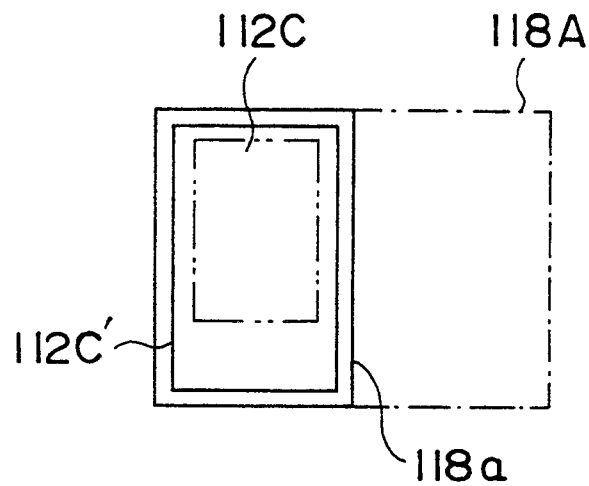

For example, in the histogram shown in FIG. 6, a peak $P_1$ at the low density white side is produced by a transparent area of the film outside the images 12, 14 in FIG. 7. On the other hand, a peak $P_2$ at the black (high density) side is produced by the background in the images 12, 14. Accordingly, the required images are distributed between the two peaks $P_1$ and $P_2$. The threshold calculating means 64 finds its density at a certain ratio to the density $D_2$ of the peak $P_2$ as the threshold $D_{TH}$ for binarizing, and stores the result in memory.

The threshold detector means 58 finds a threshold $D_{TH}(n)$ in the similar manner with 15 scanning lines between the (n−1)-th and the n-th black frame detecting scanning lines 26(n−1) and 26(n). This threshold $D_{TH}(n)$ is used for detection of a black frame by the n-th black frame detecting scanning line 26(n) which is subsequently read. In this case, a histogram may be created which includes the (n−1)-th black frame detecting the scanning line 26(n−1) and the scanning lines in a certain range before it.

The first binarizing means 56 binarizes the image signal of the n-th scanning line 26(n) by using the threshold $D_{TH}(n)$ thus found by the threshold detector means 58. This binarized signal is input into black frame detector means 66 where a black frame is detected and stored in the memory.

The black frame detector means 66 detects black frames 22, 24 by various methods (see FIG. 7). For example, as described above, it may be arranged to detect a black frame from the fact that N black pixels continue on the scanning lines 26 in the area of the image 12 (see FIG. 7 (A)).

Even if black pixels do not continue, it may be possible to determine an area where black pixels appear in a predetermined frequency or more as a black frame. For example, as shown in FIG. 7 (B), it may be arranged to detect existence of a black frame from the fact that a % (for example, 30%) of N continuous pixels (for example, 160) is black pixels, and to determine that a coordinate X 32 x−Nb, which is one traced back from the coordinate x, where the number of black pixels becomes a %, by Nb pixels, is a black frame.

In this case, Nb pixels indicates the number of dots to a coordinate which divides the area of N pixels into a ratio of (1−b)/b, and is desired to be set to b≈a. Although the above description is made for a case where the scan is performed from the outside to the inside of the images 12, 14, the operation may be conducted by replacing the black pixels in the above description with white pixels for a case where the scan is performed from the inside to the outside of the images 12, 14. When the black frame is thus detected by various methods, the area of a black frame is determined by connecting the points for the black frame found for each scanning line 26, and the black frame area is stored in the memory.

On the other hand, on the screen 48, predetermined areas (screen projection areas) 16A, 16B of the microfilm 30 are projected and displayed. Then, the entire projected image on the screen 48 may contain a plurality of images (i.e., document images) as shown in FIGS. 4 (A), and 5 (A). The screen projection area 16A of the microfilm 10A in FIG. 4 (A) contains an image 12C and a part of an image 12D. In addition, the screen projection area 16B of the microfilm 10B in FIG. 5 (A) contains images 12E, 12e, 12F, 12f, 12G, 12g, and the like of the front and back sides of bills or checks.

A black frame 22A in the predetermined area 16A of FIG. 4 is detected by the black frame detector means 66 and stored in the memory. An appropriate area 16C 20 containing a required document image (for example, 12f) is extracted by a trimming means (which is not shown). A black frame 22B of the extracted area 16C is detected by the black frame detector means 66 and stored in the memory.

In FIG. 1B, reference numeral 67 denotes black frame modifying means. When the predetermined area 16 (as shown in FIG. 7) or 16A (as shown in FIG. 4) to be output to a printer or the like, or the extracted area 16C (as shown in FIG. 5) contains a plurality of document images, the black frame modifying means 67 selects only a required document image by a method described later, and rewrites non-selected document images into black.

For example, in the case as seen in FIG. 4 (A), 12C of two document images 12C and 12D is taken as a selected document image, while the area of the image 12D is turned to black. In other words, the image signals of all pixels contained in the image area of the image 12D other than the selected image 12C are converted into signals representing black. This smears the area of the image 12D as the black frame in addition to the intrinsic black frame 22A. Similarly, in the case of FIG. 5 (A), one image, for example, 12f is selected as a selected document image, and the area of other images is turned to black. The area thus converted into black is stored as a modified black frame.

A document image at a predetermined position in the predetermined area 16A or the extracted area 16C may be arranged to be automatically selected as the selected document image. For example, a document image at the left end, the right end, the upper left corner, or the lower left corner may be selected as the selected image. The selection of a document image may be performed by inputting coordinates on the screen 48 through a keyboard. In addition, images read by the line sensor 52 may be displayed on display means such as a CRT or a liquid crystal panel. and a selected image may be specified by a pointing device such as a touch panel or a mouse, or a keyboard on the display means.

As described above, detection of a black frame and detection of a threshold $D_{TH}(n)$ are performed by the first scanning of the projected image. Then, in the second scanning of the projected image, the image signals are binarized in the second binarizing means 60 by using the thus found threshold $D_{TH}(n)$. In detail, a part of an image incident near the n-th scanning line 26(n) is binarized using the threshold $D_{TH}(n)$. Depending on an image reading area, a threshold $D_{TH}$ for each image reading area is sequentially read from the memory and is used for the binarization.

The binarized image signal is input into image processing means 68. The image processing means 68 effects enlargement or contraction of an image, or effects various spacial filtering processing such as edge emphasizing, thinning or dithering through differential operation.

The image signal subjected to such image processing undergoes in masking means 70 masking processing for erasing unnecessary areas such as a black frame. The black frame effected with the masking process is one with modification for making unnecessary pixels black by the black frame modifying means 67. That is, the black frame region is the intrinsic black frame area plus an area filled with black pixels as a non-selected image.

The image erased with the black frame is enlarged by an image enlarging means 72. Enlargement magnification $P$ is entered through the keyboard 38B which serves as print magnification setting means. Any desired print magnification $P$ can be freely entered.

The size of the image enlarged with this print magnification $P$ is input into paper selection means 74 where a suitable paper size is determined. For example, as shown in FIG. 4, in a case where the print out size of the selected image 12C corresponds to paper 18a of A-4 size while the screen projection area is A-3 size, this A-4 sized paper 18a is selected. Also, as shown in FIG. 5, if the printout size of the selected image 12f fits in A-5 size, A-5 size paper 18b is selected.

Once the paper size corresponding to the printout size of the selected image 12C or 12f is selected by the paper selection means 74, the selected image 12C or 12f is enlarged to the selected size of the paper 18a or 18b and output to a printer 76 for printing. At the moment, since the modified black frame is also erased by the masking processing, images other than the selected image 12C or 12f are not printed.

The operation of this embodiment will be explained by referring to FIG. 2. First, the reduction ratio of the image photographed on the microfilm 30, i.e., the magnification (restore magnification) $m$ for restoring the recorded image on the microfilm 30 to the size of original copy is entered through the keyboard 38B or the like (step 100). The projection magnification setting means 38C determines the magnification $M$ of the optical system lower than the restore magnification $m$ (step 102), and drives the motor 38A (step 104).

After the magnification $M$ of the optical system is set (steps 102 and 104), projection is started, and the enlarged image is projected on the screen 48 (step 106). The first scanning by the line sensor 52 (image reading) (step 108) finds a histogram of the pixel density through scanning between the scanning lines 26, 26 at a predetermined interval (step 110), and the threshold $D_{TH}$ (step 112).

Then, the image signal obtained along the scanning line 26 is binarized by the first binarizing means 56 using the threshold $D_{TH}$ (step 114), a black frame is detected (step 116), and the black frame area is stored in the memory. When the processing is complete for the entire area of the image by repeating the above operation (step 118), the black frame is modified (step 120).

The black frame modifying process (step 120) selects one or more images from the scanned image area, and rewrites the image area other than these selected images to black. The black frame modifying process is performed by the procedure shown in FIG. 3. First, after the black frame is detected (step 116), it is determined whether or not a plurality of images are contained (step 120A).

If the projected and scanned image area contains only one image (document image), modification of the black frame is not necessary. If a plurality of images (document images) are contained in the scanned image area, only the required images are selected (step 120B). The areas of the other document images are rewritten to black (step 120C), the black frame is modified to include the thus rewritten area in the black frame (step 120D), and stored in the memory. Then, the second scanning is started (step 122).

In the second scanning, the image is binarized by using the histogram found in step 112 (step 124), and the binarized image is subjected to the image processing (step 126). Then, the black frame found in step 116 and modified in step 120 is masked and erased (step 128). The image enlarging means 72 enlarges the selected images with the desired print magnification $P$ entered through the keyboard 38B (step 130). On the other hand, the paper selection means 74 determines the paper size corresponding to the enlarged image (step 132), and the printer 76 prints out on the paper of this size (step 134).

In the above described embodiment, the magnification $M$ of the optical system is automatically set by the projection magnification setting means 38C. However, in the present invention, the magnification $M$ of the optical system 35 may manually set by a projection lens 38 consisting of a manual zoom lens, or may have a fixed magnification by using a projection lens 38 consisting of single magnification lens. In this case, when the magnification $M$ of the optical system 35 is lower than the restore magnification $m$ (M <m), the read image is enlarged by the restore magnification $m$ and printed out.

Although the print magnification setting means is constituted by the keyboard 38B in this embodiment, other setting means such as an independent dial may be provided instead of the keyboard 38D. Furthermore, the print paper may be manually selected instead of automatic selection by the paper selection means 74, or print out may be performed on a predetermined size of paper. In this case, if the paper is not sized to fit the image enlarged to the print magnification, the image enlarging means 72 would reduce the read image. The present invention includes such a situation.

As described above, where a plurality of images are contained in an area enlarged and projected on the screen, the present invention retains a required image (selected image), rewrites other images to black similar to a black frame, and masks them as the black frame, so that only the required image is output, and unnecessary images are removed. Since the enlarged image projected onto the screen is made smaller than the original copy, there is little chance of the image being outside of the screen so that the screen need not be unnecessarily large, and the print is not smaller than the original copy.

Further, since the selected image is enlarged and printed out at desired print magnification, it is possible to output a print of the desired size adapted to the size of paper. If the device is arranged to automatically select the size of paper according to the size of the print out, and to print onto that paper, the print is not output to paper that is larger than required, and thus a large blank area is not produced on the paper.

Second Embodiment

The second embodiment of the present invention enlarges a selected image to the maximum size fitting paper of a predetermined or given size.

A microfilm print control apparatus used for this embodiment has a similar overall arrangement to that of the first embodiment, but differs from the first embodiment in the operation of image enlarging means 72 and lack of paper selection means.

As in the first embodiment, a recorded image on the microfilm projected on the screen 48 is read by the line sensor 52, and binarized. After detection of the black frame, the black frame modifying means 67 leaves a required image and modifies other images into black.

The image with the black frame erased is enlarged by the image enlarging means 72. The image enlarging means 72 of the second embodiment enlarges the selected image to the maximum size that can fit the predetermined print paper size (for example, A-4). That is, the selected image is simultaneously enlarged in the vertical and horizontal directions until it fully fits the predetermined paper size in either direction.

For example, as shown in FIG. 7 (A), in a case where 112C and 112D are images recorded in one frame of the microfilm 110A, and considerably smaller than the enlarged and projection area 116A (for example, A-3 size) on the screen, the selected image 112C is printed out as it is in the first embodiment. On the other hand, in the second embodiment, the selected image 112C is enlarged to the maximum size that can fit the predetermined print paper size (for example, A-4) 118a, and printed as an enlarged image 112C' shown in FIG. 7 (B). 122A is a black frame area, while 118A is the size of print paper when the image is output in the same size as the projection area (for example, A-3 size) 116A of the screen.

Figure 8:
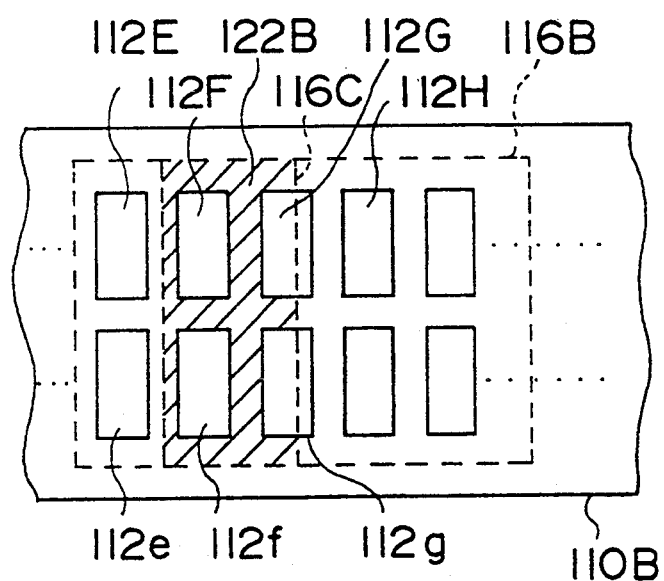
FIG. 8, parts A and B, shows examples of a printout according to the second embodiment of the present invention.
Figure 8:
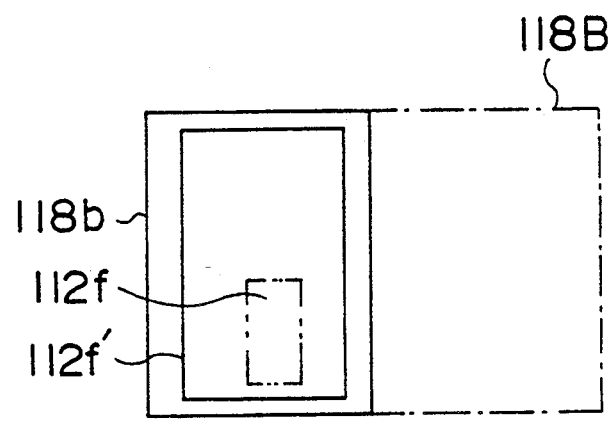
Figure 9:
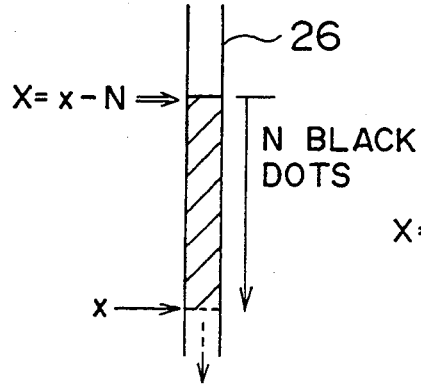
FIG. 9, parts A and B, shows relationships between a microfilm and printouts.
Figure 9:
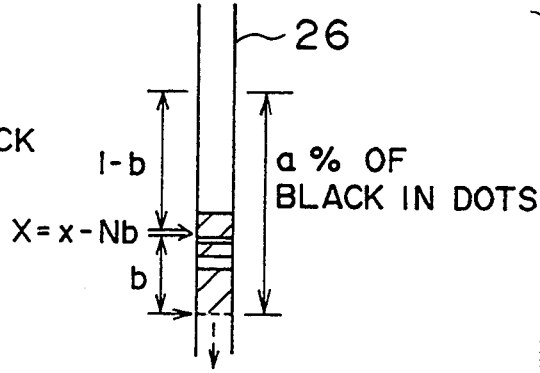
Figure 9:
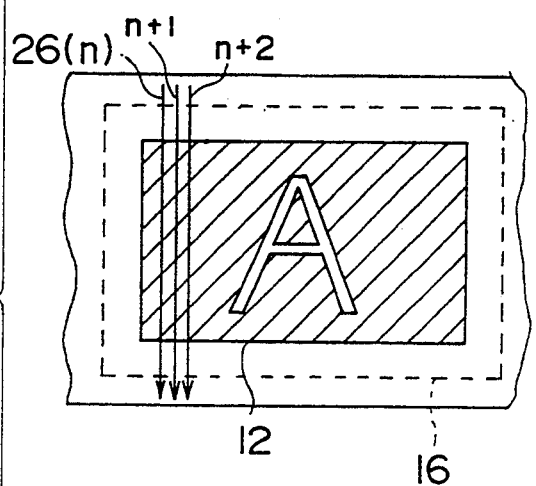
Figure 9:
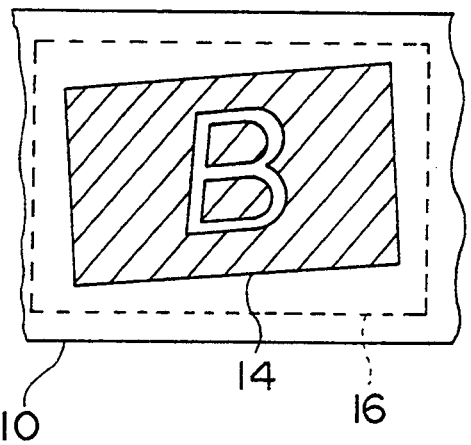
Figure 9:
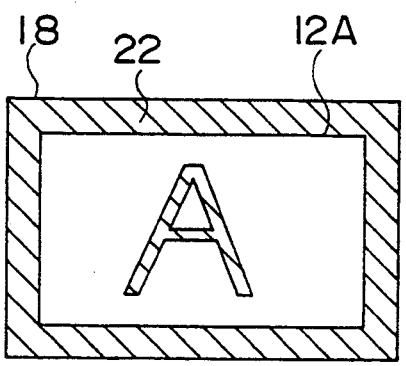
Figure 9:
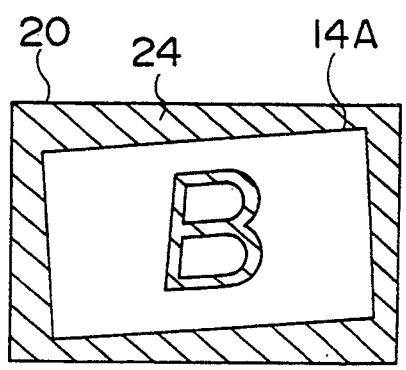

In another example of this second embodiment, the front side images 112E, 112F .... and the back side images 112e, 112f, .. of bank bills or checks are recorded on the microfilm 110B, and a selected image 112f selected from an extracted area 116C extracted (trimmed) from the screen projection area (for example, A-3 size) 16B is enlarged to the predetermined paper size (for example, A-4 size) (FIG. 8). Reference numeral 112f denotes this enlarged image. 118B shows the size of print paper when the image is output in the same size as the screen projection area (for example, A-3 size) 116B.

The enlarged images 112C' and 112f are input to the printer 76. The printer 76 prints out the enlarged images 112C' and 112f on the paper 118a, 118b with the predetermined size. Since the modified black frame is masked and erased, images other than the selected images 112C and 112f are not printed.

The operation sequence of the second embodiment differs from that of the first embodiment in step 130. Moreover, since the print paper size has been set, step 132 for determining the paper size becomes unnecessary and is omitted. That is, the procedure up to step 128 is exactly the same as that of the first embodiment. When the modified black frame is masked and erased in step 128, the image with the modified black frame erased is enlarged by the image enlarging means 72 to the maximum size which causes the selected image to fit the predetermined paper size (step 130). The print means 76 prints out the image on the paper with the predetermined size (step 134).

The predetermined paper may be previously set through a keyboard or the like, or only paper of one size may be used.

As described above, since the second embodiment of the present invention enlarges the selected image to the maximum size which fits the predetermined print paper size, and performs printout to the print paper of this size, it can output print of the maximum size adapted to the paper size. This prevents a print from being output to unnecessarily large paper, and a large blank area from being produced on the paper. In this case, since the print paper size is unified, it is convenient for document filing, and the image is easy to view since the image is enlarged to the maximum size on this paper.

While the present invention has been illustrated and described in connection with the preferred embodiments, it is not to be limited to the specific construction shown. It should be understood by those skilled in the art that various changes and modifications may be made without departing from the spirit and scope of the present invention as defined in the appended claims.

What is claimed is:

1. In a method for printing out an image by projecting on a screen a recorded image photographed on a microfilm, by detecting a black frame from an array of pixels indicated by image signals, which is obtained by reading and binarizing the projected image on the screen, and by erasing said black frame from the projected image, a print control method for a microfilm reader comprising steps of:

a) enlarging the recorded image with a magnification $\underline{M}$ lower than a restore magnification $\underline{m}$ for enlarging the recorded image to the size of an original copy, and projecting the thus enlarged image as the projected image on the screen;

b) when an entire area of said projected image read from the screen contains plural document images and black frames thereof, selecting one or more document images as a selected document image, and modifying other document images other than said selected document image to black frames;

c) erasing said modified black frames from the projected image;

d) enlarging said selected document images without black frames including the modified black frame at magnification which can be arbitrarily set; and e) printing out the thus enlarged selected document image.

2. The print control method for a microfilm reader according to claim 1, wherein the size of print paper on which said enlarged selected document image is printed out is automatically selected to be the minimum size which fits the enlarged selected document image.

3. In a print control apparatus for a microfilm reader comprising:
- an optical system for enlarging a recorded image photographed on a microfilm and projecting the thus enlarged image on a screen;
- image reading means for reading the enlarged and projected image on the screen and outputting image signals;
- binarizing means for binarizing the image signals and outputting binarized image signals;
- black frame detector means for detecting a black frame from an array of pixels indicated by the binarized image signals;
- masking means for erasing the detected black frame from an image read by said image reading means; and
- a printer for printing out the image with a black frame erased;
- said print control apparatus for a microfilm reader being characterized by further comprising:
  a) restore magnificatzion inputting means for inputting a restore magnification $\underline{m}$ which is a magnification ratio for enlarging the recorded image photographed on the microfilm to the size of an original copy;
  b) projection magnification setting means for setting a magnification $\underline{M}$ of said optical system lower than said restore magnification $\underline{m}$;
  c) when said projected image contains plural document images and black frames thereof, black frame modifying means for selecting one or more document images as a selected document image and for modifying other document images other than the selected document image into black frames;
  d) print magnification setting means for setting print magnification for the selected document image; and
  e) paper selection means for automatically selecting a size of paper on which the selected document image is printed out at said print magnification,
wherein said masking means erases the modified black frames, said printer printing out said selected document image at said print magnification on the paper of the size selected by said paper selection means.

4. In a method for printing out an image by projecting on a screen a recorded image photographed on a microfilm, by detecting a black frame from an array of pixels indicated by image signals, which is obtained by reading and binarizing the projected image on the screen, and by erasing said black frame from the projected image, a print control method for a microfilm reader comprising steps of:
a) enlarging the recorded image with a magnification $\underline{M}$ lower than a restore magnification $\underline{m}$ for enlarging the recorded image to the size of an original copy, and projecting the thus enlarged image as the projected image on the screen;
b) when an entire area of said projected image read from the screen contains plural document images and black frames thereof, selecting one or more document images as a selected document image, and modifying other document images other than said selected document image to black frames;
c) erasing said modified black frames from the projected image;
d) enlarging said selected document images without black frames including the modified black frame to the maximum size that fit a predetermined paper size; and
e) printing out the thus enlarged selected document image on said paper size.

5. In a print control apparatus for a microfilm reader comprising:
- an optical system for enlarging a recorded image photographed on a microfilm and projecting the thus enlarged image on a screen;
- image reading means for reading the enlarged and projected image on the screen and outputting image signals;
- binarizing means for binarizing the image signals and outputting binarized image signals;
- black frame detector means for detecting a black frame from an array of pixels indicated by the binarized image signals;
- masking means for erasing the detected black frame from an image read by said image reading means; and
- a printer for printing out the image with a black frame erased on a print paper of predetermined size;
- said print control apparatus for a microfilm reader being characterized by further comprising:
  a) restore magnification inputting means for inputting a restore magnification $\underline{m}$ which is a magnification ratio for enlarging the recorded image photographed on the microfilm to the size of an original copy;
  b) projection magnification setting means for setting a magnification $\underline{M}$ of said optical system lower than said restore magnification $\underline{m}$;
  c) when said projected image contains plural document images and black frames thereof, black frame modifying means for selecting one or more document images as a selected document image and for modifying other document images other than the selected document image into black frames; and
  d) image enlarging means for enlarging said selected document image to the maximum size that fits the predetermined print paper size,
wherein said masking means erases the modified black frames, said printer printing out on the paper with said predetermined size the image enlarged by said image enlarging means.

* * * * *